(12) United States Patent
Wilson

(10) Patent No.: US 6,260,893 B1
(45) Date of Patent: Jul. 17, 2001

(54) FASCIA FOR A MOTOR VEHICLE HAVING REDUCED WALL THICKNESS

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/701,039
(22) PCT Filed: May 20, 1999
(86) PCT No.: PCT/US99/11195
§ 371 Date: Nov. 22, 2000
§ 102(e) Date: Nov. 22, 2000
(87) PCT Pub. No.: WO99/61287
PCT Pub. Date: Dec. 2, 1999

Related U.S. Application Data
(60) Provisional application No. 60/086,615, filed on May 22, 1998.

(51) Int. Cl.[7] .................................................... B60R 19/03
(52) U.S. Cl. .............................................................. 293/120
(58) Field of Search ..................................... 293/120, 102; 296/194, 203.02

(56) References Cited

U.S. PATENT DOCUMENTS
5,071,500  12/1991  Kumagai et al. .
5,609,374  3/1997  Sawae et al. .
5,711,562  1/1998  Terada et al. .

*Primary Examiner*—Joseph D. Pape
*Assistant Examiner*—Patricia Engle
(74) *Attorney, Agent, or Firm*—Pillsbury Winthrop LLP

(57) ABSTRACT

A fascia (10) for an automobile comprising a structure extending horizontally and vertically across an entire front end or rear end of the automobile, the structure having an average wall thickness of less than about 2.2 mm. The structure is formed from at least one polyolefin material and reinforcement particles dispersed within the at least one polyolefin material. The reinforcement particles comprise less than 15% of a total volume of the structure. At least 40% of the reinforcement particles have a thickness of less than about 50 nanometers. A decorative coating layer having at least one coloring agent is disposed on the rigid structure.

10 Claims, 1 Drawing Sheet

FASCIA FOR A MOTOR VEHICLE HAVING REDUCED WALL THICKNESS

This application also claims the benefit of U.S. Provisional Application No. 60/086,615, filed May 22, 1998.

FIELD OF THE INVENTION

This invention relates to a fascia for a motor vehicle. In particular, this invention relates to a fascia having reduced wall thickness.

BACKGROUND OF THE INVENTION

Fascia for motor vehicles typically require superior impact characteristics. More particularly, these parts must be engineered to be sufficiently flexible and ductile so as to flex and return to their original shape without cracking in the event of predetermined front or rear vehicle impact. Thus, vehicle fascia typically must have a sufficiently high modulus, and must be sufficiently ductile to withstand standard impact tests.

Fascia are generally molded from a polyolefin material which is subsequently painted to match the other "Class A" finish exterior metal body components. It is easy to damage the pre-painted molded polyolefin parts during handling in the production facilities. This is particularly true during the frequent handling, which typically occurs between the molding operation and the paint ovens. The surface damage may not be noticed until the parts are painted with the typical high gloss exterior coatings. It is not possible to recycle the molded parts back into the molding process once they have been painted, and significant value is lost with each scrap part.

In the automotive industry, there is a continuing desire to reduce the amount of material used to manufacture vehicle body parts. In particular, it is desirable to provide parts that are of lesser weight, but of the same or better structural integrity. Reducing vehicle weight increases gas mileage and also helps meet environmental requirements. Moreover, reducing the amount of material used reduces material, energy, and other costs associated with part production.

With respect to motor vehicle fascia, it is desirable to provide a part having high impact resistant characteristics. For these applications, the dimensional stability is of lesser importance. Thus. for example, fascia can be more flexible (lower modulus) and have a higher coefficient of expansion than other body parts, such as outer door panels which are bounded on more than one side by other vehicle parts. In order to maintain the impact resistance, fascia are typically devoid of any substantial reinforcement. Because the fascia is not reinforced to any significant extent, they must be made thicker to provide the requisite dimensional stability. As the thickness of the fascia increases, more material costs are incurred. and the weight of the part is also increased. Heretofore, the thinnest fascia having sufficient dimensional stability so as to be commercially acceptable has had an average wall thickness of about 2.4 mm.

SUMMARY OF THE INVENTION

The disadvantages of the prior art may be overcome by providing a fascia for an automobile comprising a structure extending horizontally and vertically across an entire front end or rear end of the automobile, the structure having an average wall thickness of less than about 2.2 mm. The structure is formed from at least one polyolefin material and reinforcement particles dispersed within the at least one polyolefin material. The reinforcement particles comprise less than 15% of a total volume of the structure. At least 40% of the reinforcement particles have a thickness of less than about 50 nanometers. A decorative coating layer having a least one coloring agent is disposed on the rigid structure.

In a more preferred embodiment, at least 50% of the reinforcement particles have a thickness of less than about 20 nanometers. It is also preferred for at least 90% of the reinforcement particles have a thickness of less than about 10 nanometers. It is also preferred for at least 99% of the reinforcement particles have a thickness of less than about 30 nanometers.

BRIEF DESCRIPTION OF THE INVENTION

DETAILED DESCRIPTION OF THE PREFERRED EMBODIMENTS

Figure 1:
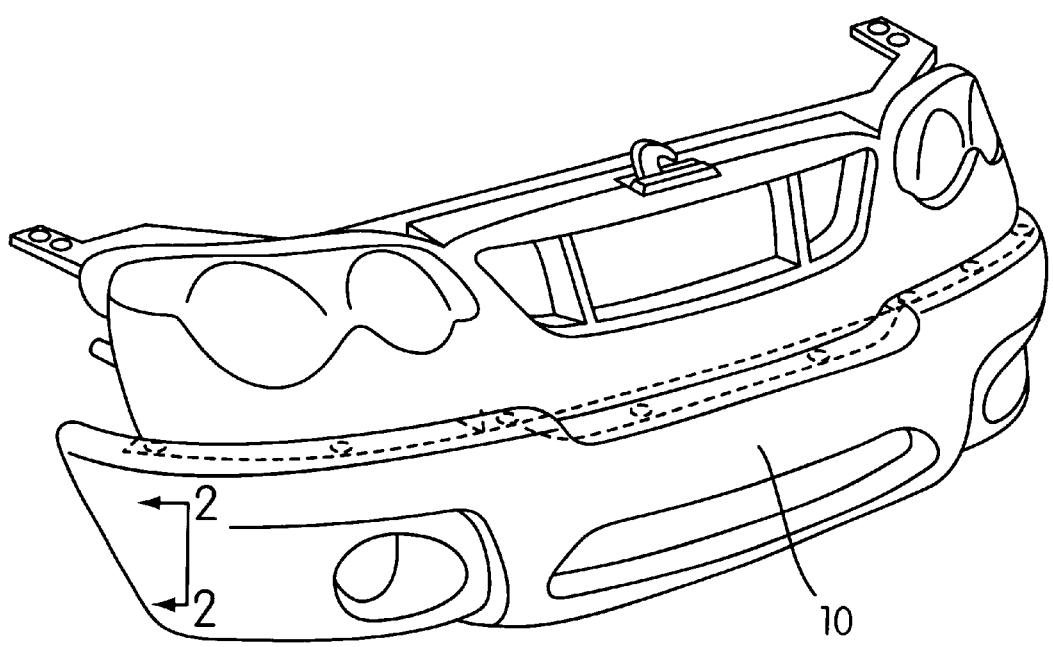
FIG. 1 is a front perspective view of a front end fascia for a motor vehicle having reduced wall thickness in accordance with the present invention.
Figure 2:
FIG. 2 is a cross sectional view taken across the line 2—2 in FIG. 1.

In accordance with the present invention, the modulus of the fascia material can be greatly increased. As a result, the wall thickness can be reduced while maintaining the same required impact resistant characteristics noted above. More particularly, with the loading of nanoparticles discussed above, the modulus of the fascia material can be increased to between about 200,000 to about 500,000 PSI, and the average wall thickness for the fascia can preferably be reduced to below 2.2 mm while maintaining the same impact resistant characteristics. More preferably. the modulus of the fascia material is between about 250,000 to 450,000 PSI and the average wall thickness for the fascia can be reduced to below 2.0 mm. The thickness of the fascia in accordance with the invention is represented by reference character "t" in FIG. 2. Preferably, the minimum average wall thickness for the fascia is greater than 1.4 mm, as wall thicknesses below this level do not provide adequate stiffness while retaining low temperature impact resistance. The accuracy of the average wall thickness measurement is generally within about +/−0.2 mm.

The automobile fascia manufactured in accordance with the present invention comprises a composite material of a polymer having dispersed therein reinforcement fillers in the form of very small mineral reinforcement particles. The reinforcement filler particles, also referred to as "nanoparticles" due to the magnitude of their dimensions, each comprise one or more generally flat platelets. Each platelet has a thickness of between 0.7–1.2 nanometers. Generally, the average platelet thickness is approximately 1 nanometer thick. The aspect ratio (which is the largest dimension divided by the thickness) for each particle is about 50 to about 300.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadiite, and kenyaite. Mixed Mg and Al hydroxides may also be used. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The composites of the present invention are prepared by combining the platelet mineral with the desired polymer in the desired ratios. The components can be blended by general techniques known to those skilled in the art. For example, the components can be blended and then melted in mixers or extruders.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190. Additional background is included in the following references: U.S. Pat. Nos. 4,739,007 and 5,652, 284.

Preferably, the polymer used for the purposes of the present invention is a polyolefin or a blend of polyolefins. The preferred polyolefin is at least one member selected from the group consisting of polypropylene, ethylene-propylene copolymers, thermoplastic olefins (TPOs), and thermoplastic polyolefin elastomers (TPEs).

The exfoliation of layered mineral particles into constituent layers need not be complete in order to achieve the objects of the present invention. The present invention contemplates that at least 40% of the particles should be less than about 50 nanometers in thickness and, thus, at least 40% of the particles should be less than about 50 platelets stacked upon one another in the thickness direction. More preferably, at least 50% of the particles should have a thickness of less than 10 nanometers. Even more preferably, at least 70% of the particles should have a thickness of less than 5 nanometers. It is most preferable to have as many particles as possible to be as small as possible, ideally including only a single platelet.

In the most preferred embodiment, at least 50% of the particles should be less than about 20 nanometers in thickness, and at least 99% of the particles should be less than about 30 nanometers in thickness.

As noted above, the preferred aspect ratio (which is the largest dimension divided by the thickness) for each particle is about 50 to about 300. At least 80% of the particles should be within this range. If too many particles have an aspect ratio above 300, the material becomes too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably, at least 90% of the particles have an aspect ratio within the 100–200 range.

Generally, in accordance with the present invention, each of the parts to be manufactured should contain less than 15% by volume of the reinforcement particles of the type contemplated herein. The balance of the part is to comprise an appropriate polyolefin material and suitable additives. If greater than 15% by volume of reinforcement filler is used, the viscosity of the composition becomes too high and thus difficult to mold.

In accordance with the present invention, by adding the exfoliated platelet material in accordance with the above, the modulus of the fascia can be increased without losing impact resistance. Because the modulus is increased, the fascia can be made thinner than what was otherwise possible. Conventionally, fascia materials for automobiles must have sufficient flexibility, and thus a sufficiently low modulus to withstand various standard automotive impact tests. For example, an automotive fascia must withstand a typical dart (puncture type) impact test wherein the fascia will not crack or permanently deform upon impact of at least 200 inch pounds force at a temperature of −30° C. or lower. In a conventional IZOD impact test, it is desirable for the fascia to withstand at least 10 ft pounds/inch at room temperature and at least 5ft pounds/inch at −30° C. In order to withstand cracking at such force levels, the modulus for the fascia is typically between about 70,000 to about 150,000 pounds per square inch. (PSI). With this modulus, the thinnest fascia known has had an average wall thickness of about 2.4 mm.

Because the modulus of the fascia material can be greatly increased, the wall thickness can be reduced while maintaining the same required impact resistant characteristics noted above. More particularly, with the loadings of exfoliated platelets discussed above, the modulus of the fascia material can be increased to between about 200,000 to about 500,000 PSI, and the average wall thickness for the fascia can preferably be reduced to below 2.2 mm while maintaining the same impact resistant characteristics. More preferably, the modulus of the fascia material is between about 250,000 to 450,000 PSI and the average wall thickness for the fascia can be reduced to below 2.0 mm. Again, the accuracy of the average wall thickness measurement techniques is within about +/−0.2 mm.

In addition to the above mentioned benefits, the coefficient of linear thermal expansion can be reduced to less than 40×10–6 inches of expansion per inch of material per degree Fahrenheit (IN/IN)/° F., which is less than 60% of what was previously achievable for motor vehicle fascia that meet the required impact tests. As a further benefit, the surface toughness of the fascia can be improved.

The improved surface toughness provided by the nanoparticles greatly reduces handling damage and part scrap. It also eliminates the need for the extra packaging and protective materials and the labor involved.

It has also been found that it is possible to more than double the modulus of polymers without significantly reducing toughness. Thus, it is possible to produce parts like fascia using 25–35% thinner wall sections that will have comparable performance. The use of nanoparticles can provide the mechanical, thermal, and dimensional property enhancements, which are typically obtained by adding 20–50% by weight of glass fibers or mineral fillers or combinations thereof to polymers. However, only a few percent of nanoparticles are required to obtain these property enhancements.

As a result of the fact that such low levels of nanoparticles are required to obtain the requisite mechanical properties, many of the typical negative effects of the high loadings of conventional reinforcements and fillers are avoided or significantly reduced. These advantages include: lower specific gravity for a given level of performance, better surface appearance, toughness close to that of the unreinforced base polymer, and reduced anisotropy in the molded parts.

It is preferable for these relatively flexible panels to have reinforcement particles of the type described herein comprising about 2–8% of the total volume of the panel, with the balance comprising the polyolefin substrate. It is even more preferable for these exterior panels to have reinforcement particles of the type contemplated herein comprising about 3%–5% of the total volume of the panel.

It should be noted that the decorative coating layer having a least one coloring agent discussed herein may comprise any suitable paint used in the automotive industry.

It should be appreciated that the foregoing description is illustrative in nature and that the present invention includes modifications, changes, and equivalents thereof, without departure from the scope of the invention. Thus, the present invention encompasses all embodiments and equivalents contemplated by the spirit and scope of the following claims.

What is claimed is:

1. An automobile fascia, comprising: a structure extending horizontally and vertically across an entire front end or rear end of the automobile, said structure having an average wall thickness of less than about 2.2 mm, said structure formed from at least one polyolefin material and reinforcement particles dispersed within the at least one polyolefin material, said reinforcement particles comprising less than 15% of a total volume of the structure, at least 40% of the reinforcement particles having a thickness of less than about 50 nanometers, and a decorative coating layer having a least one coloring agent disposed on the structure.

2. A fascia for an automobile in accordance with claim 1, wherein at least 50% of the reinforcement particles have a thickness of less than about 20 nanometers and wherein at least 99% of the reinforcement particles have a thickness of less than about 30 nanometers.

3. A fascia for an automobile in accordance with claim 2, wherein a modulus of the fascia is between about 250,000 to about 450,000 PSI.

4. A fascia for an automobile in accordance with claim 1, wherein said structure has an average wall thickness greater than about 1.4 mm.

5. A fascia for an automobile in accordance with claim 4, wherein the average wall thickness is below about 2.0 mm.

6. A fascia for an automobile in accordance with claim 1, wherein said polyolefin is at least one member selected from the group consisting of polypropylene, ethylene-propylene copolymers, thermoplastic olefins (TPOs), and thermoplastic polyolefin elastomers (TPEs).

7. A fascia for an automobile in accordance with claim 1, wherein at least 80% of said reinforcement particles have an aspect ratio of about 50 to about 300.

8. A fascia for an automobile in accordance with claim 7, wherein at least 90% of the reinforcement particles have an aspect ratio of about 100 to about 200.

9. A fascia for an automobile in accordance with claim 1, wherein said reinforcement particles comprise at least one material selected from a group consisting of montmorillonite, vermiculite, hectorite, saponite, hydrotalcites, kanemite, sodium octosilicate, magadiite, and kenyaite.

10. A fascia for an automobile in accordance with claim 1, wherein said reinforcement particles comprise about 2–8% of the total volume of the fascia.

* * * * *

UNITED STATES PATENT AND TRADEMARK OFFICE
CERTIFICATE OF CORRECTION

PATENT NO. : 6,260,893 B1 Page 1 of 1
DATED : July 17, 2001
INVENTOR(S) : Wilson It is certified that error appears in the above-identified patent and that said Letters Patent is hereby corrected as shown below:

<u>Column 1,</u>
Line 3, please add the following immediately following the Title of the Invention:

-- Governmental Support and Interest:

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES - NEW LOW COST/HIGH STRENGTH MATERIALS FOR AUTOMOTIVE PARTS," awarded September 30, 1997 by the United States Department of Commerce, National Institute of Standards and Technology, Advanced Technology Program. The Government has certain rights in this invention. --

Signed and Sealed this

Sixth Day of May, 2003

JAMES E. ROGAN
*Director of the United States Patent and Trademark Office*